United States Patent
Qiu et al.

(10) Patent No.: US 11,825,001 B2
(45) Date of Patent: Nov. 21, 2023

(54) NUMERICAL VALUE RANKING METHOD AND APPARATUS BASED ON BLOCKCHAIN

(71) Applicant: CHINA UNIONPAY CO., LTD., Shanghai (CN)

(72) Inventors: Zhenyao Qiu, Shanghai (CN); Yang Yang, Shanghai (CN); Zhou Chen, Shanghai (CN); Zili Huang, Shanghai (CN); Lu Xiong, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/918,890

(22) PCT Filed: Sep. 2, 2021

(86) PCT No.: PCT/CN2021/116130
§ 371 (c)(1),
(2) Date: Oct. 13, 2022

(87) PCT Pub. No.: WO2022/088969
PCT Pub. Date: May 5, 2022

(65) Prior Publication Data
US 2023/0291586 A1    Sep. 14, 2023

(30) Foreign Application Priority Data
Oct. 29, 2020    (CN) .......................... 202011179521.X

(51) Int. Cl.
*H04L 9/00*    (2022.01)
*H04L 9/30*    (2006.01)
*H04L 9/32*    (2006.01)

(52) U.S. Cl.
CPC .................. *H04L 9/50* (2022.05); *H04L 9/30* (2013.01); *H04L 9/3271* (2013.01)

(58) Field of Classification Search
CPC .............................. H04L 9/30–38; H04L 9/50
See application file for complete search history.

(56) References Cited

U.S. PATENT DOCUMENTS

| | | | |
|---|---|---|---|
| 2009/0182667 A1* | 7/2009 | Parkes | H04L 9/14 705/50 |
| 2017/0039377 A1* | 2/2017 | Nicholls | G06Q 30/08 |
| 2020/0313856 A1 | 10/2020 | Basu et al. | |

FOREIGN PATENT DOCUMENTS

| | | |
|---|---|---|
| CN | 103064931 A | 4/2013 |
| CN | 110113326 A | 8/2019 |

(Continued)

OTHER PUBLICATIONS

Blass, Erik-Oliver, and Florian Kerschbaum. "BOREALIS: Building Block for Sealed Bid Auctions on Blockchains." Cryptology ePrint Archive (2019). (Year: 2019).*

(Continued)

*Primary Examiner* — Madhuri R Herzog
(74) *Attorney, Agent, or Firm* — ANOVA LAW GROUP, PLLC

(57) ABSTRACT

A blockchain based numerical value ranking method includes: using, by a first participant, a public key of the first participant to encrypt a private value of the first participant to obtain an encrypted text of the first participant; obtaining encrypted texts of other participants, and generating a challenge value having a preset bit length; based on the challenge value and the private value of the first participant, and the encrypted texts and public keys of the other participants, determining mixed results of the first participant with respect to the other participants; and determining a numerical value ranking result between the first participant and a second participant based on the mixed result of the second participant with respect to the first participant.

11 Claims, 3 Drawing Sheets

(56) References Cited

FOREIGN PATENT DOCUMENTS

| CN | 110348231 A | 10/2019 |
|---|---|---|
| CN | 110830232 A | 2/2020 |
| CN | 111127020 A | 5/2020 |
| CN | 111639925 A | 9/2020 |
| CN | 111709738 A | 9/2020 |
| CN | 111738238 A | 10/2020 |
| CN | 112288523 A | 1/2021 |

OTHER PUBLICATIONS

Blass, Erik-Oliver, and Florian Kerschbaum. "Strain: A secure auction for blockchains." Computer Security: 23rd European Symposium on Research in Computer Security, ESORICS 2018, Barcelona, Spain, Sep. 3-7, 2018, Proceedings, Part I 23. Springer International Publishing, 2018. (Year: 2018).*

Lafourcade, Pascal, et al. "Security analysis of auctionity: A blockchain based e-auction." Foundations and Practice of Security: 12th International Symposium, FPS 2019, Toulouse, France, Nov. 5-7, 2019, Revised Selected Papers 12. Springer International Publishing, 2020. (Year: 2019).*

The World Intellectual Property Organization (WIPO) International Search Report for PCT/CN2021/116130 dated Nov. 29, 2021 7 pages (including translation).

* cited by examiner

NUMERICAL VALUE RANKING METHOD AND APPARATUS BASED ON BLOCKCHAIN

CROSS-REFERENCE TO RELATED APPLICATION

This application is a national phase entry under 35 U.S.C § 371 of International Patent Application No. PCT/CN2021/116130, filed on Sep. 2, 2021, which claims priority to Chinese Patent Application No. 202011179521.X, filed on Oct. 29, 2020, the entire contents of all of which are incorporated herein by reference.

TECHNICAL FIELD

The present disclosure relates to the technical field of blockchain technologies and, more particularly, to a numerical value ranking method and apparatus based on blockchain.

BACKGROUND

As computer technologies advance, more and more computer technologies are applied in the financial field. The traditional financial industry is gradually transforming to adopt financial technologies. However, because of the security and real-time requirements of the financial industry, it sets higher standards for the financial technologies. For example, applying the blockchain technology in the financial field for anonymous bidding becomes an important research field.

Generally, multiple participants in a bidding or an auction need to be numerically ranked. Publicly disclosing bids in an entire auction process cannot satisfy the potential need for privacy. On the other hand, collusion between a bidder and a middle party may occur and a final result may be unreliable if the bids and transactions are obscured and totally controlled by the middle part. Thus, obtaining one's own ranking without knowing original bids of other parties is a technical challenge in this scenario.

SUMMARY

The present disclosure provides a blockchain based numerical value ranking method and apparatus, which are used to solve the problems of untrustworthiness of anonymous auctions based on blockchain in the existing technology, improve credibility of numerical ranking, and protect participant's privacy.

One aspect of the present disclosure provides a blockchain based numerical value ranking method. The method includes: using, by a first participant, a public key of the first participant to encrypt a private value of the first participant to obtain an encrypted text of the first participant, and sending the encrypted text of the first participant to a blockchain for an on-chain operation; obtaining, by the first participant, encrypted texts of other participants, and generating a challenge value having a preset bit length; based on the challenge value and the private value of the first participant, and the encrypted texts and public keys of the other participants, determining, by the first participant, mixed results of the first participant with respect to the other participants, and sending the mixed results of the first participant with respect to the other participants to the blockchain for the on-chain operation, wherein the other participants are participants that are located in the same blockchain as the first participant and participate in a numerical value ranking process; and determining, by the first participant, a numerical value ranking result between the first participant and a second participant based on the mixed result of the second participant with respect to the first participant, wherein the second participant is one of the other participants that participate in the numerical value ranking process.

In the above technical solution, through comparing the positive/negative attribute of the mixed result obtained by the other participants using the public key of the first participant to encrypt the challenge values, the encrypted texts, and other information of the other participants, the numerical value ranking result can be determined. Without obtaining the private values of the other participants, each participant can obtain its own numerical value ranking result, thereby improving credibility of the numerical value ranking result and protecting privacy of each participant.

In some embodiments, determining, by the first participant, the mixed results of the first participant with respect to the other participants based on the challenge value and the private value of the first participant, and the encrypted texts and public keys of the other participants includes: using, by the first participant, the public keys of the other participants to encrypt the challenge value and the private value of the first participant to obtain a first intermediate value; determining, by the first participant, a product of the encrypted texts of the other participants and the challenge value of the first participant as a second intermediate value; and determining, by the first participant, a difference between the first intermediate value and the second intermediate value as the mixed results of the first participant with respect to the other participants.

In some embodiments, determining, by the first participant, the numerical value ranking result between the first participant and the second participant based on the mixed result of the second participant with respect to the first participant includes: obtaining, by the first participant, from the blockchain the mixed result of the second participant with respect to the first participant that is uploaded by the second participant; using, by the first participant, the private key of the first participant to decrypt the mixed result of the second participant with respect to the first participant to obtain a decrypted result; and determining, by the first participant, the numerical value ranking result between the first participant and the second participant based on a positive/negative attribute of the decrypted result.

In some embodiments, determining, by the first participant, the numerical value ranking result between the first participant and the second participant based on the positive/negative attribute of the decrypted result includes: determining, by the first participant, that the private value of the first participant is smaller than a private value of the second participant if the positive/negative attribute of the decrypted result is positive; determining, by the first participant, that the private value of the first participant is greater than the private value of the second participant if the positive/negative attribute of the decrypted result is negative; and determining, by the first participant, that the private value of the first participant is equal to the private value of the second participant if the positive/negative attribute of the decrypted result is zero.

In some embodiments, after the numerical value ranking result between the first participant and the second participant is determined by the first participant, the method further includes: after the first participant determines that the first participant is a winner based on the numerical value ranking result between the first participant and the second participant, sending the private key of the first participant to an intermediate party, such that the intermediate party uses the private key of the first participant to decrypt the encrypted text of the first participant to obtain the private value of the first participant.

In some embodiments, after the numerical value ranking result between the first participant and the second participant is determined by the first participant, the method further includes: when the first participant determines that the private value of the winner is in dispute and is not disclosed, verifying a legitimacy by sending the private key of the first participant to the intermediate party or requesting the winner to send a challenge value of the winner to the intermediate party.

Another aspect of the present disclosure provides a blockchain based numerical value ranking apparatus. The apparatus includes: a processing unit configured to use a public key of a first participant to encrypt a private value of the first participant to obtain an encrypted text of the first participant, and sending the encrypted text of the first participant to a blockchain for an on-chain operation; and an acquisition unit configured to obtain encrypted texts of other participants and generate a challenge value having a preset bit length. The processing unit is further configured to: determine mixed results of the first participant with respect to the other participants based on the challenge value and the private value of the first participant and the encrypted texts and public keys of the other participants, and send the mixed results of the first participant with respect to the other participants to blockchain for the on-chain operation, wherein the other participants are participants that are located in a same blockchain as the first participant and participate in a numerical value ranking process; and determine a numerical value ranking result between the first participant and a second participant based on a mixed result of the second participant with respect to the first participant, wherein the second participant is one of the other participants that participate in the numerical value ranking process.

In some embodiments, the processing unit is further configured to: use the public keys of the other participants to encrypt the challenge value and the private value of the first participant to obtain a first intermediate value; determine a product of the encrypted texts of the other participants and the challenge value of the first participant as a second intermediate value; and determine a difference between the first intermediate value and the second intermediate value as the mixed results of the first participant with respect to the other participants.

In some embodiments, the processing unit is further configured to: obtain from the blockchain the mixed result of the second participant with respect to the first participant that is uploaded by the second participant; use the private key of the first participant to decrypt the mixed result of the second participant with respect to the first participant to obtain a decrypted result; and determine the numerical value ranking result between the first participant and the second participant based on a positive/negative attribute of the decrypted result.

In some embodiments, the processing unit is further configured to: determine that the private value of the first participant is smaller than a private value of the second participant if the positive/negative attribute of the decrypted result is positive; determine that the private value of the first participant is greater than the private value of the second participant if the positive/negative attribute of the decrypted result is negative; and determine that the private value of the first participant is equal to the private value of the second participant if the positive/negative attribute of the decrypted result is zero.

In some embodiments, the processing unit is further configured to: after the first participant determines that the first participant is a winner based on the numerical value ranking result between the first participant and the second participant, send the private key of the first participant to an intermediate party, such that the intermediate party uses the private key of the first participant to decrypt the encrypted text of the first participant to obtain the private value of the first participant.

In some embodiments, the processing unit is further configured to: when the first participant determines that the private value of the winner is in dispute and is not disclosed, verify a legitimacy by sending the private key of the first participant to the intermediate party or requesting the winner to send a challenge value of the winner to the intermediate party.

Another aspect of present disclosure provides a computing device. The computing device includes: a memory for storing program instructions; and a processor configured to call the program instructions stored in the memory, wherein when being executed by the processor, the program instructions cause the processor to perform the disclosed blockchain based numerical value ranking method.

Another aspect of present disclosure provides a computer-readable storage medium. The computer-readable storage medium includes: computer-readable instructions, where when being retrieved and executed by a computer, the computer-readable instructions cause the computer to perform the disclosed blockchain based numerical value ranking method.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only a part of the embodiments of the present disclosure, not all of the embodiments. Based on the embodiments of the present disclosure, all other embodiments obtained by those of ordinary skill in the art without creative efforts shall fall within the protection scope of the present disclosure.

Figure 1:
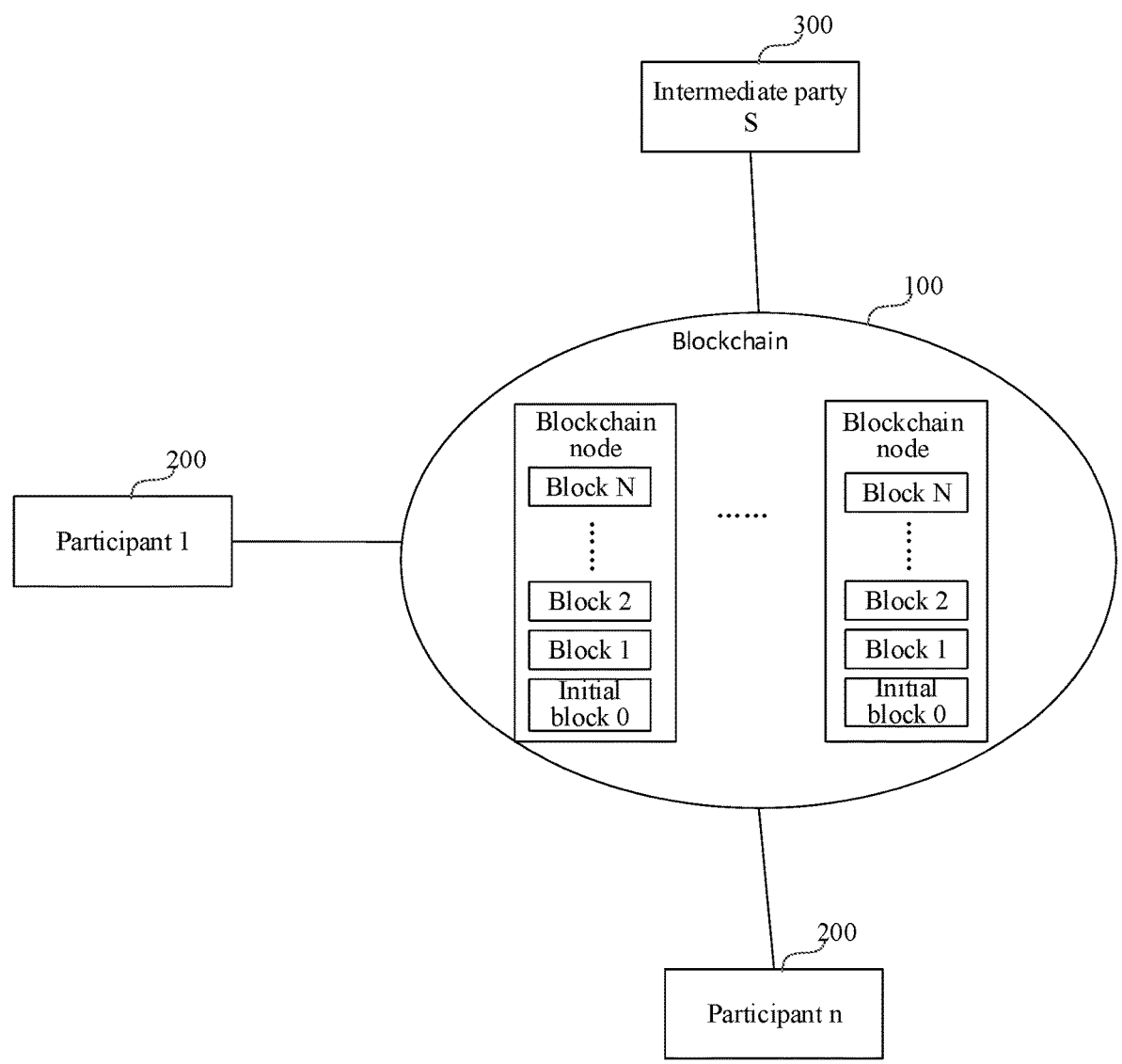
FIG. 1 is a schematic diagram of an exemplary system architecture according to some embodiments of the present disclosure.

FIG. 1 is a schematic diagram of an exemplary system architecture according to some embodiments of the present disclosure. As shown in FIG. 1, the system architecture may include a blockchain 100, multiple participants 200 (1 to n), and a middle party (S) 300. The multiple participants 200 may be different institutions participating in a government bidding or an auction house bidding. The multiple participants 200 are located in a same blockchain.

The blockchain 100 includes a plurality of blocks configured to store encrypted bids submitted by the multiple participants 200.

The middle party 300 is a bid solicitor or an auction party located in the same blockchain as the multiple parties.

It should be noted that the architecture shown in FIG. 1 above is merely intended to be exemplary, and does not limit the embodiments of the present disclosure.

Figure 2:
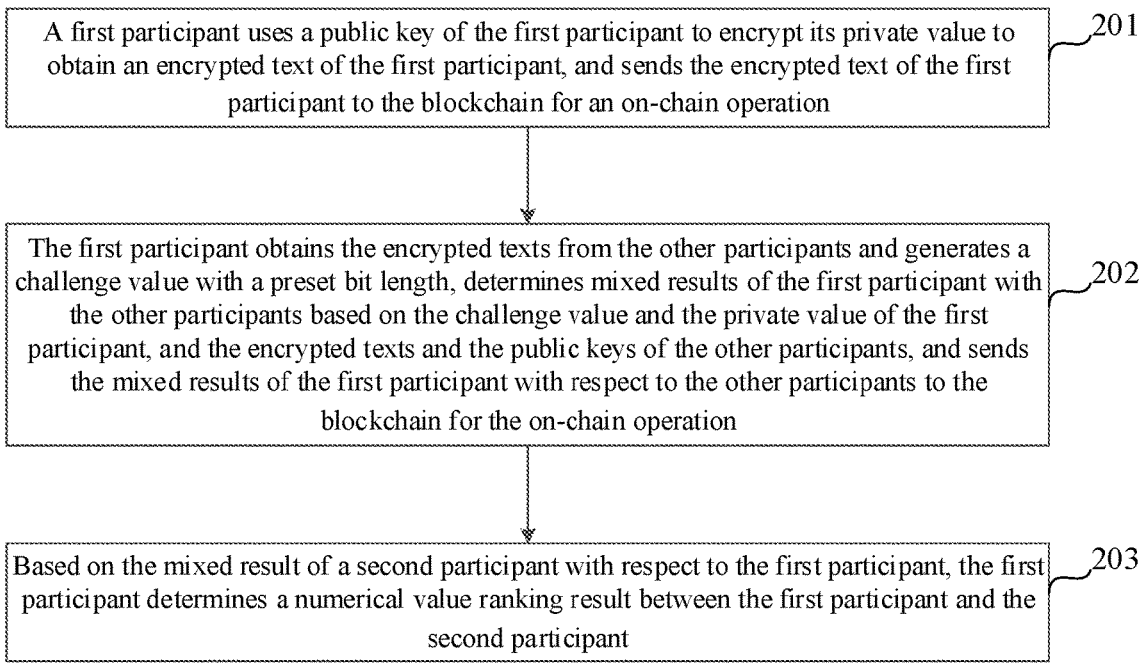
FIG. 2 is a flowchart of an exemplary blockchain based numerical value ranking method according to some embodiments of the present disclosure.

In view of this, FIG. 2 is a flowchart of an exemplary blockchain based numerical value ranking method according to some embodiments of the present disclosure. The method may be executed by a blockchain based numerical value ranking apparatus. The apparatus may be located within any one of the above-described parties. The embodiments of the present disclosure can be applied to a government project bidding process, and bids evaluation in the bidding process.

As shown in FIG. 2, the method includes the following processes.

At step 201, a first participant uses a public key of the first participant to encrypt its private value to obtain an encrypted text of the first participant, and sends the encrypted text of the first participant to the blockchain for an on-chain operation.

In some embodiments, before the bid is encrypted, each participant also needs to generate a key pair including a public key and a private key, and sends the public key to other participants. For example, each participant I generates a homomorphically encrypted public-private key pair ($pk_i$, $sk_i$), and discloses the public key $pk_i$. In the embodiments of the present disclosure, the encryption method may be a homomorphic encryption. The other participants are participants participating in a same numerical value ranking operation as the first participant.

After each participant sends the public thereof to the other participants, each participant i uses its own public key $pk_i$ to homomorphically encrypt its own private value $p_i$ to obtain an encrypted text $c_i = E_i(p_i)$, and the on-chain operation is performed for the encrypted text. It should be noted that, in practical applications, the private value may be a bid of a participant, or a value that cannot be disclosed to the other participants.

After all n participants completes the on-chain operation of the encrypted text thereof, the blockchain contains the encrypted texts $\{c_1, \ldots, c_n\}$ of the private values of all n participants.

At step 202, the first participant obtains the encrypted texts from the other participants and generates a challenge value with a preset bit length, determines mixed results of the first participant with the other participants based on the challenge value and the private value of the first participant, and the encrypted texts and the public keys of the other participants, and sends the mixed results of the first participant with respect to the other participants to the blockchain for the on-chain operation.

After each participant competes the on-chain operation for the encrypted text thereof, the first participant obtains the encrypted texts of the other participants from the blockchain, and generates the challenge value with the preset bit length. The challenge value may be a random number. A length of the challenge value is related to a length of the public key and a length of the private key. For example, the length of the challenge value may be a quarter of the length of the public key or the private key. If the length of the challenge value is not limited, a reversal of positive/negative attribute may occur when the mixed result is calculated.

Next, the mixed results are calculated. For example, the first participant uses the public keys of the other participants to encrypt the challenge value and the private value to obtain a first intermediate value. The encrypted texts of the other participants are multiplied by the challenge value of the first participant to obtain a second intermediate value. A difference between the first intermediate value and the second intermediate value is determined to be the mixed results of the first participant with respect to the other participants.

For example, each participant i obtains the public keys $\{pk_1, \ldots, pk_{i-1}, pk_{i+1}, \ldots, pk_n\}$ of the other participants $\{1, \ldots, i-1, i+1, \ldots, n\}$, and generates its own challenge value $r_i$. The mixed result of each participant i with respect to the other participant 1 is calculated as $d_{i,1} = E_1(p_i r_i) - E_1(p_1)r_i = E_1((p_i - p_1)r_i)$, where $E_1(p_i r_i)$ is the first intermediate value, and $E_1(p_1)r_i$ is the second intermediate value. Similarly, the mixed results of the participant i with respect to the remaining other participant $\{2, \ldots, i-1, i+1, \ldots, n\}$ are calculated as $d_{i,2} = E_2((p_i - p_2)r_i), \ldots, d_{i,i-1} = E_{i-1}((p_i - p_{i-1})r_i)$, $d_{i,i+1} = E_{i+1}((p_i - p_{i+1})r_i), \ldots, d_{i,n} = E_n((p_i - p_n)r_i)$. The on-chain operations are performed on the mixed results.

After the mixed results for the n participants are completed, the blockchain now includes the encrypted texts and the mixed results for all the participants. The complete list of the mixed results is shown in Table 1 below.

TABLE 1

|   | 1 | 2 | , , , | n − 1 | n |
|---|---|---|---|---|---|
| 1 | / | $d_{1,2}$ | ... | $d_{1,n-1}$ | $d_{1,n}$ |
| 2 | $d_{2,1}$ | / | ... | $d_{2,n-1}$ | $d_{2,n}$ |
| ... | ... | ... | ... | ... | ... |
| n − 1 | $d_{n-1,1}$ | $d_{n-1,2}$ | ... | / | $d_{n-1,n}$ |
| N | $d_{n,1}$ | $d_{n,2}$ | ... | $d_{n,n-1}$ | / |

At S203, based on the mixed result of a second participant with respect to the first participant, the first participant determines a numerical value ranking result between the first participant and the second participant.

In some embodiments, the first participant obtains a numerical value ranking result based on the mixed results of the participants that need to be included in the numerical ranking with respect to the first participant. For example, the first participant obtains from the blockchain the mixed result of the second participant with respect to the first participant, which is uploaded by the second participant. The first participant uses its private key to decrypt the mixed result of the second participant with respect to the first participant to obtain the decrypted result. Based on the positive/negative attribute of the decrypted result, the first participant determines the numerical value ranking result between the first participant and the second participant. The second participant is a participant having bids being compared among the other participants.

The numerical value ranking result is determined in the following three scenarios.

First Scenario

If the positive/negative attribute of the decrypted result is positive, the first participant determines that a private value of the first participant is smaller than a private value of the second participant.

In some embodiments, when the bids in the encrypted texts of one participant i and any other participant j are compared, the first participant i obtains $d_{j,i}=E_i((p_j-p_i)r_j)$ from the blockchain. Next, the first participant i uses its private key $sk_i$ to decrypt $d_{j,i}$ to obtain the decrypted result $(p_j-p_i)r_j$. Next, the first participant i determines a numerical value ranking result between $p_j$ and $p_i$ based on the positive/negative attribute of the decrypted result $(p_j-p_i)r_j$. When the positive/negative attribute of the decrypted result $(p_j-p_i)r_j$ is positive, it indicates that $p_j$ is greater than $p_i$, that is, the private value of the participant j is greater than the private value of the participant i. At this time, the participant i knows its own private value is smaller than the private value of the participant j, and may adjust its own private value in a next bidding round.

Second Scenario

If the positive/negative attribute of the decrypted result is negative, the first participant determines that the private value of the first participant is greater than the private value of the second participant.

Similarly, in some embodiments, when the positive/negative attribute of the decrypted result $(p_j-p_i)r_j$ is negative, it indicates that $p_j$ is smaller than $p_i$, that is, the private value of the participant j is smaller than the private value of the participant i. At this time, the participant i knows its own private value is greater than the private value of the participant j.

Third Scenario

If the positive/negative attribute of the decrypted result is zero, the first participant determines that the private value of the first participant is equal to the private value of the second participant.

Similarly, in some embodiments, when the positive/negative attribute of the decrypted result $(p_j-p_i)r_j$ is zero, it indicates that $p_j$ is equal to $p_i$, that is, the private value of the participant j is equal to the private value of the participant i. At this time, the participant i knows its own private value is equal to the private value of the participant j.

The participant i may use the above-described method to compare the numerical values (i.e., the bids in a current bidding round) with all the other participants $\{1, \ldots, i-1, i+1, \ldots, n\}$, that is, obtaining its own ranking in the current bidding round.

In the embodiments of the present disclosure, each participant only needs a random number, and obtains the mixed result through simple calculation. Thus, an amount of data included in the up-link operation is limited, thereby reducing a system overhead and improving an efficiency of the numerical value ranking.

Figure 3:
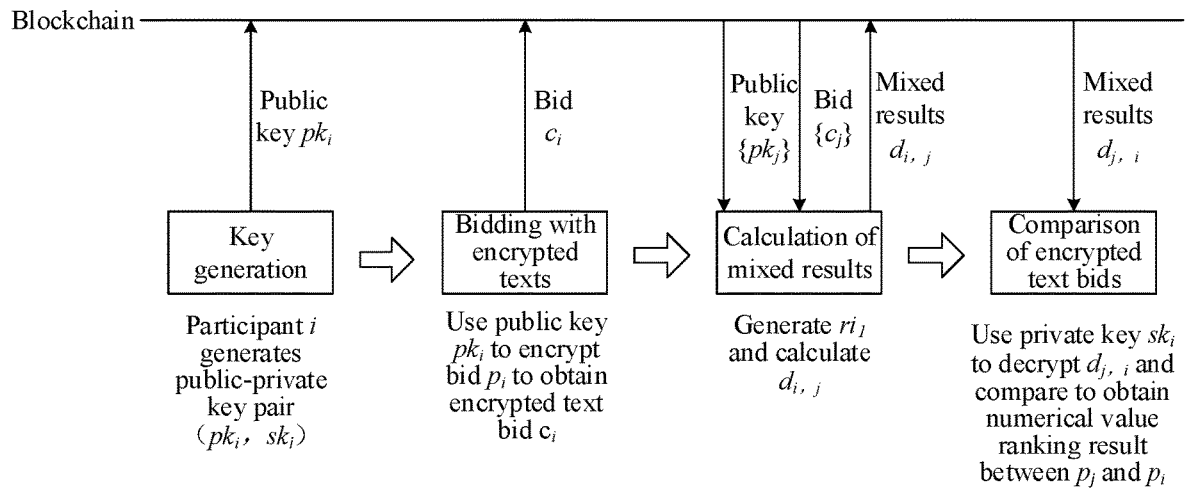
FIG. 3 is a flowchart of another exemplary blockchain based numerical value ranking method according to some embodiments of the present disclosure.

FIG. 3 is a flowchart of another exemplary blockchain based numerical value ranking method according to some embodiments of the present disclosure. In some embodiments, as shown in FIG. 3, the entire process includes kye generation, bidding with encrypted texts, calculation of mixed results, and comparison of encrypted text bids, etc. The steps shown in FIG. 3 have described in detail previously in various embodiments.

It should be noted that, after the numerical value ranking result between the first participant and the second participant is determined, when the numerical value ranking result between the first participant and the second participant determines the first participant is the winner, the private key of the first participant is sent to the intermediate party, such that the intermediate party cane use the private key of the first participant to decrypt the encrypted text of the first participant to obtain the private value of the first participant. When it is determined that the private value of the winner is in dispute and the private value of the winner is not disclosed, legality verification may be performed by sending the private key of the first participant to the intermediate party or requesting the winner to send the challenge value of the winner to the intermediate party.

To better explain the embodiments of the present disclosure, the process of the blockchain based numerical value ranking will be described below in specific scenarios.

The embodiment is a blockchain based numerical value ranking method for bidding/auction scenarios. Participants include three bidders A, B, and C (which may be extended to any number of bidders) and an intermediate party S (bid solicitor/auctioneer). The homomorphic encryption algorithm is Paillier addition homomorphic encryption algorithm.

Embodiment One

0. Initialization

The intermediate party S specifies a total number of rounds of bidding, that is, when the number of rounds of bidding is reached, the transaction is completed.

1. Key Generation (1) Bidder A generates a public-private key pair $(pk_a, sk_a)$, and discloses the public key $pk_a$.

(2) Bidder B generates a public-private key pair $(pk_b, sk_b)$, and discloses the public key $pk_b$.

(3) Bidder C generates a public-private key pair $(pk_c, sk_c)$, and discloses the public key $pk_c$.

The bidders may use different public-private key pairs in each round of bidding.

2. Bidding with Encrypted Texts (1) Bidder A uses the public key $pk_a$ to homomorphically encrypt a bid $p_a$ to obtain $E_a(p_a)$, and performs an on-chain operation for $E_a(p_a)$.

(2) Bidder B uses the public key $pk_b$ to homomorphically encrypt a bid $p_b$ to obtain $E_b(p_b)$, and performs an on-chain operation for $E_b(p_b)$.

(3) Bidder C uses the public key $pk_c$ to homomorphically encrypt a bid $p_c$ to obtain $E_c(p_c)$, and performs an on-chain operation for $E_c(p_c)$.

3. Calculation of Mixed Results (1) Bidder A

Bidder A obtains the public key $pk_b$ and the public key $pk_c$ and obtains from the blockchain the encrypted bids $E_b(p_b)$ and $E_c(p_c)$. Bidder A generates a challenge value $r_a$ (a bit length of the challenge value needs to be limited, for example, being set to a quarter of a length of the public-private key, otherwise causing a reversal of a positive/negative attribute of a mixed result). Bidder A calculates $E_b(p_a \cdot r_a) - E_b(p_b) \cdot r_a = E_b((p_a - p_b) \cdot r_a)$ and $E_c(p_a \cdot r_a) - E_c(p_c) \cdot r_a = E_c((p_a - p_c) \cdot r_a)$, and performs the on-chain operation for the results of the calculation.

(2) Bidder B

Bidder B obtains the public key $pk_a$ and the public key $pk_c$ and obtains from the blockchain the encrypted bids $E_a(p_a)$ and $E_c(p_c)$. Bidder B generates a challenge value $r_b$. Bidder B calculates $E_a(p_b \cdot r_b) - E_a(p_a) \cdot r_b = E_a((p_b - p_a) \cdot r_b)$ and $E_b(p_b \cdot r_b) - E_c(p_c) \cdot r_b = E_c((p_b - p_c) \cdot r_b)$, and performs the on-chain operation for the results of the calculation.

(3) Bidder C

Bidder C obtains the public key $pk_a$ and the public key $pk_b$ and obtains from the blockchain the encrypted bids $E_a(p_a)$ and $E_b(p_b)$. Bidder C generates a challenge value $r_c$. Bidder C calculates $E_a(p_c \cdot r_c) - E_a(p_a) \cdot r_c = E_a((p_c - p_a) \cdot r_c)$ and $E_b(p_c \cdot r_c) - E_b(p_b) \cdot r_c = E_b((p_c - p_b) \cdot r_c)$, and performs the on-chain operation for the results of the calculation.

4. Comparison of Encrypted Text Bids (1) Bidder A (a) Comparison of bidder A's bid and bidder B's bid: bidder A obtains from the blockchain $E_a((p_b - p_a) \cdot r_b)$, uses the private key $sk_a$ to decrypt $E_a((p_b - p_a) \cdot r_b)$ to obtain $(p_b - p_a) \cdot r_b$, and obtains a numerical value ranking result between $p_a$ and $p_b$ through determining the positive/negative attribute of $(p_b - p_a) \cdot r_b$. At the same time, bidder A is unable to obtain a specific bid difference due to existence of the challenge value $r_b$.

(b) Comparison of bidder A's bid and bidder C's bid: bidder A obtains from the blockchain $E_a((p_c - p_a) \cdot r_c)$, uses the private key $sk_a$ to decrypt $E_a((p_c - p_a) \cdot r_c)$ to obtain $(p_c - p_a) \cdot r_c$, and obtains a numerical value ranking result between $p_a$ and $p_c$ through determining the positive/negative attribute of $(p_c - p_a) \cdot r_c$. At the same time, bidder A is unable to obtain a specific bid difference due to existence of the challenge value $r_c$.

(2) Bidder B (a) Comparison of bidder B's bid and bidder A's bid: bidder B obtains from the blockchain $E_b((p_a - p_b) \cdot r_a)$, uses the private key $sk_b$ to decrypt $E_b((p_a - p_b) \cdot r_a)$ to obtain $(p_a - p_b) \cdot r_a$, and obtains a numerical value ranking result between $p_b$ and $p_a$ through determining the positive/negative attribute of $(p_a - p_b) \cdot r_a$. At the same time, bidder B is unable to obtain a specific bid difference due to existence of the challenge value $r_a$.

(b) Comparison of bidder B's bid and bidder C's bid: bidder B obtains from the blockchain $E_b((p_c - p_b) \cdot r_c)$, uses the private key $sk_b$ to decrypt $E_b((p_c - p_b) \cdot r_c)$ to obtain $(p_c - p_b) \cdot r_c$, and obtains a numerical value ranking result between $p_c$ and $p_b$ through determining the positive/negative attribute of $(p_c - p_b) \cdot r_c$. At the same time, bidder B is unable to obtain a specific bid difference due to existence of the challenge value $r_c$.

(3) Bidder C (a) Comparison of bidder C's bid and bidder A's bid: bidder C obtains from the blockchain $E_c((p_a - p_c) \cdot r_a)$, uses the private key $sk_c$ to decrypt $E_c((p_a - p_c) \cdot r_a)$ to obtain $(p_a - p_c) \cdot r_a$, and obtains a numerical value ranking result between $p_c$ and $p_a$ through determining the positive/negative attribute of $(p_a - p_c) \cdot r_a$. At the same time, bidder C is unable to obtain a specific bid difference due to existence of the challenge value $r_a$.

(b) Comparison of bidder C's bid and bidder B's bid: bidder C obtains from the blockchain $E_c((p_b - p_c) \cdot r_b)$, uses the private key $sk_c$ to decrypt $E_c((p_b - p_c) \cdot r_b)$ to obtain $(p_b - p_c) \cdot r_b$, and obtains a numerical value ranking result between $p_c$ and $p_b$ through determining the positive/negative attribute of $(p_b - p_c) \cdot r_b$. At the same time, bidder C is unable to obtain a specific bid difference due to existence of the challenge value $r_b$.

5. Completion of Transaction

After the total number of rounds of bidding is reached, the lowest bidder in case of bidding for a government project (or the highest bidder in case of bidding for an auction item) needs to provide the intermediate party S with the private key $sk_i$ used in the last round of bidding for the intermediate party S to decrypt the private value $p_i$ (i.e., the transaction value). After the intermediate party S obtains the final transaction value, the intermediate party S may or may not disclose the final transaction value. Disclosure of the final transaction value may avoid dispute.

6. Handling Dispute (1) The Final Transaction Value is not Disclosed.

Fraud may occur when the final transaction value is not disclosed, and the fraudulent bidder uses different bids in a same round of bidding. For example, in the scenario that the lowest bid wins, bidder A uses different $p_a$ in the process of bidding, which makes the other bidders mistakenly believe that their bids are too high and they did not win. But bidder A actually bids higher and deceives the other bidders. For example, bidder A uses different $p_a$ when calculating $E_a(p_a)$ and $E_b((p_a - p_b) \cdot r_a)$, which makes bidder B believe that $p_a$ is smaller than $p_b$, while $p_a$ of $E_a(p_a)$ is actually greater than $p_b$.

To resolve this issue, bidder B may provide the private key $sk_b$ to the intermediate party S, enabling the intermediate party S to compare bidder A's bid and bidder B's bid. Alternatively, bidder A may be requested to provide the challenge value $r_a$ to the intermediate party S to verify legitimacy of the calculation of the mixed results.

(2) The Final Transaction Value is Disclosed.

When the final transaction value is disclosed, the other bidders may directly verify the final transaction value is lower than their own bids. Thus, fraud risk does not exist.

The present disclosure also provides another method of blockchain based numerical value ranking. The method includes the following processes.

Embodiment Two

0. Initialization

The intermediate party S specifies the total number of rounds of bidding, that is, when the number of rounds of bidding is reached, the transaction is completed.

1. Key Generation (1) Bidder A generates a public-private key pair $(pk_a, sk_a)$, and discloses the public key $pk_a$.

(2) Bidder B generates a public-private key pair $(pk_b, sk_b)$, and discloses the public key $pk_b$.

(3) Bidder C generates a public-private key pair $(pk_c, sk_c)$, and discloses the public key $pk_c$.

The bidders may use different public-private key pairs in each round of bidding.

2. Bidding with Encrypted Texts (1) Bidder A uses the public key $pk_a$ to homomorphically encrypt a bid $p_a$ to obtain $E_a(p_a)$, and performs an on-chain operation for $E_a(p_a)$.

(2) Bidder B uses the public key $pk_b$ to homomorphically encrypt a bid $p_b$ to obtain $E_b(p_b)$, and performs an on-chain operation for $E_b(p_b)$.

(3) Bidder C uses the public key $pk_c$ to homomorphically encrypt a bid $p_c$ to obtain $E_c(p_c)$, and performs an on-chain operation for $E_c(p_c)$.

3. Calculation of mixed results (1) Bidder A (a) Bidder A obtains the public key $pk_b$ and the public key $pk_c$, generates challenge values $r_{a_1}$ and $r_{a_2}$, calculates $E_b(p_a \cdot r_{a_1} + r_{a_2})$ and $E_c(p_a \cdot r_{a_1} + r_{a_2})$, and performs the on-chain operation for the results of the calculation.

(b) Bidder A obtains from the blockchain $E_b(p_b)$ and $E_c(p_c)$, calculates $E_b(p_b) \cdot r_{a_1} + E_b(r_{a_2}) = E_b(p_b \cdot r_{a_1} + r_{a_2})$ and $E_c(p_c) \cdot r_{a_1} + E_c(r_{a_2}) = E_c(p_c \cdot r_{a_1} + r_{a_2})$, and performs the on-chain operation for the results of the calculation.

(2) Bidder B (a) Bidder B obtains the public key $pk_a$ and the public key $pk_c$, generates challenge values $r_{b_1}$ and $r_{b_2}$, calculates $E_a(p_b \cdot r_{b_1}+r_{b_2})$ and $E_b(p_b \cdot r_{b_1}+r_{b_2})$, and performs the on-chain operation for the results of the calculation.

(b) Bidder B obtains from the blockchain $E_a(p_a)$ and $E_a(p_c)$, calculates $E_a(p_a) \cdot r_{b_1}+E_a(r_{b_2})=E_a(p_a \cdot r_{b_1}+r_{b_2})$ and $E_c(p_c) \cdot r_{b_1}+E_c(r_{b_2})=E_c(p_c \cdot r_{b_1}+r_{b_2})$, and performs the on-chain operation for the results of the calculation.

(3) Bidder C (a) Bidder C obtains the public key $pk_a$ and the public key $pk_b$, generates challenge values $r_{c_1}$ and $r_{c_2}$, calculates $E_a(p_c \cdot r_{c_1}+r_{c_2})$ and $E_b(p_c \cdot r_{c_1}+r_{c_2})$, and performs the on-chain operation for the results of the calculation.

(b) Bidder C obtains from the blockchain $E_a(p_a)$ and $E_b(p_b)$, calculates $E_a(p_a) \cdot r_{c_1}+E_a(r_{c_2})=E_a(p_a \cdot r_{c_1}+r_{c_2})$ and $E_b(p_b) \cdot r_{c_1}+E_b(r_{c_2})=E_b(p_b \cdot r_{c_1}+r_{c_2})$, and performs the on-chain operation for the results of the calculation.

4. Comparison of Encrypted Text Bids (1) Bidder A (a) Bidder A obtains from the blockchain $E_a(p_b \cdot r_{b_1}+r_{b_2})$ and $E_a(p_a \cdot r_{b_1}+r_{b_2})$, uses the private key $sk_a$ to decrypt $E_a(p_b \cdot r_{b_1}+r_{b_2})$ and $E_a(p_a \cdot r_{b_1}+r_{b_2})$ to obtain $p_b \cdot r_{b_1}+r_{b_2}$ and $p_a \cdot r_{b_1}+r_{b_2}$, and obtains a numerical value ranking result between $p_a$ and $p_b$.

(b) Bidder A obtains from the blockchain $E_a(p_c \cdot r_{c_1}+r_{c_2})$ and $E_a(p_a \cdot r_{c_1}+r_{c_2})$, uses the private key $sk_a$ to decrypt $E_a(p_c \cdot r_{c_1}+r_{c_2})$ and $E_a(p_a \cdot r_{c_1}+r_{c_2})$ to obtain $p_c \cdot r_{c_1}+r_{c_2}$ and $p_a \cdot r_{c_1}+r_{c_2}$, and obtains a numerical value ranking result between $p_a$ and $p_c$.

(2) Bidder B (a) Bidder B obtains from the blockchain $E_b(p_a \cdot r_{a_1}+r_{a_2})$ and $E_b(p_b \cdot r_{a_1}+r_{a_2})$, uses the private key $sk_b$ to decrypt $E_b(p_a \cdot r_{a_2})$ and $E_b(p_b \cdot r_{a_1}+r_{a_2})$ to obtain $p_a \cdot r_{a_1}+r_{a_2}$ and $p_b \cdot r_{a_1}+r_{a_2}$, and obtains a numerical value ranking result between $p_b$ and $p_a$.

(b) Bidder B obtains from the blockchain $E_b(p_c \cdot r_{c_1}+r_{c_2})$ and $E_b(p_b \cdot r_{c_1}+r_{c_2})$, uses the private key $sk_b$ to decrypt $E_b(p_c \cdot r_{c_1}+r_{c_2})$ and $E_b(p_b \cdot r_{c_1}+r_{c_2})$ to obtain $p_c \cdot r_{c_1}+r_{c_2}$ and $p_b \cdot r_{c_1}+r_{c_2}$, and obtains a numerical value ranking result between $p_b$ and $p_c$.

(3) Bidder C (a) Bidder C obtains from the blockchain $E_c(p_a \cdot r_{a_1}+r_{a_2})$ and $E_c(p_c \cdot r_{a_1}+r_{a_2})$, uses the private key $sk_c$ to decrypt $E_c(p_a \cdot r_{a_1}+r_{a_2})$ and $E_c(p_c \cdot r_{a_1}+r_{a_2})$ to obtain $p_a \cdot r_{a_1}+r_{a_2}$ and $p_c \cdot r_{a_1}+r_{a_2}$, and obtains a numerical value ranking result between $p_c$ and $p_a$.

(b) Bidder C obtains from the blockchain $E_c(p_b \cdot r_{b_1}+r_{b_2})$ and $E_c(p_c \cdot r_{b_1}+r_{b_2})$, uses the private key $sk_c$ to decrypt $E_c(p_b \cdot r_{b_1}+r_{b_2})$ and $E_c(p_c \cdot r_{b_1}+r_{b_2})$ to obtain $p_b \cdot r_{b_1}+r_{b_2}$ and $p_c \cdot r_{b_1}+r_{b_2}$, and obtains a numerical value ranking result between $p_c$ and $p_b$.

5. Completion of Transaction

After the total number of rounds of bidding is reached, the lowest bidder in case of bidding for a government project (or the highest bidder in case of bidding for an auction item) needs to provide the intermediate party S with the private key $sk_i$ used in the last round of bidding for the intermediate party S to decrypt the private value $p_i$ (i.e., the transaction value). After the intermediate party S obtains the final transaction value, the intermediate party S may or may not disclose the final transaction value. Disclosure of the final transaction value may avoid dispute.

6. Handling Dispute (1) The Final Transaction Value is not Disclosed.

Fraud may occur when the final transaction value is not disclosed, and the fraudulent bidder uses different bids in a same round of bidding. For example, in the scenario that the lowest bid wins, bidder A uses different $p_a$, $r_{a_1}$, and $r_{a_2}$ in the process of bidding, which makes the other bidders mistakenly believe that their bids are too high and they did not win. But bidder A actually bids higher and deceives the other bidders. Specifically, there are two scenarios as described in the following.

(a) Bidder A uses different $p_c$, when calculating $E_a(p_a)$ and $E_c(p_a \cdot r_{a_1}+r_{a_2})$, which makes bidder C believe that $p_c \cdot r_{a_1}+r_{a_2}$ is smaller than $p_c \cdot r_{a_1}+r_{a_2}$, while $p_a$ of $E_a(p_a)$ is actually greater than $p_c$.

(b) Bidder A uses different $r_{a_1}$ and $r_{a_2}$ when calculating $E_c(p_a \cdot r_{a_1}+r_{a_2})$ and $E_c(p_c \cdot r_{a_1}+r_{a_2})$, which makes bidder C believe that $p_a \cdot r_{a_1}+r_{a_2}$ is smaller than $p_c \cdot r_{a_1}+r_{a_2}$, while $p_a$ of $E_c(p_a \cdot r_{a_1}+r_{a_2})$ is actually greater than $p_c$. In this case, bidder A is requested to provide the challenge values $r_{a_1}$ and $r_{a_2}$ to the intermediate party S, and bidder C provides the private key $sk_c$ to the intermediate party S to verify legitimacy of the calculation of the mixed results.

In both scenarios described above, bidder C provides the private key $sk_c$ to the intermediate party S, enabling the intermediate party S to compare bidder C's bid and bidder A's bid. Alternatively, bidder A may be requested to provide the challenge values $r_{a_1}$ and $r_{a_2}$ to the intermediate party S to verify legitimacy of the entire process.

(2) The Final Transaction Value is Disclosed.

When the final transaction value is disclosed, the other bidders may directly verify the final transaction value is lower than their own bids. Thus, fraud risk does not exist.

The embodiments of the present disclosure achieve the following technical effects.

(1) The embodiments of the present disclosure achieve protection of bid privacy. The participants are unable to know the bids from the other participants. The intermediate party S (i.e., the bid solicitor or the auctioneer) can only know the bid of the final transaction. Thus, collusion between the participants and the intermediate party S in a traditional bidding scenario can be prevented.

(2) the embodiments of the present disclosure does not need to introduce a trusted third party other than the bidding solicitor or the auctioneer, thereby reducing points of attack and avoiding collusion risk.

(3) The embodiments of the present disclosure solves the problem of comparing numerical values in the encrypted texts that are encrypted using different encryption keys by multiple participants, such that each participant is able to compare the bids by itself without compromising confidence.

In the embodiments of the present disclosure, after the first participant uses the public key to encrypt its private value and obtains the encrypted text of the first participant, the first participant obtains the encrypted texts of the other participants, generates the challenge value, determines the mixed results of the first participant with respect to the respective other participants based on the challenge value and the private value of the first participant and the encrypted texts and the public keys of the respective other participants, and determines the numerical value ranking result between the first participant and the second participant based on the mixed result of the second participant with respect to the first participant. Through comparing the positive/negative attribute of the mixed result obtained by the other participants using the public key of the first participant to encrypt the challenge values, the encrypted texts, and other information of the other participants, the numerical value ranking result can be determined. Without obtaining the private values of the other participants, each participant can obtain its own numerical value ranking result, thereby improving credibility of the numerical value ranking result and protecting privacy of each participant.

Figure 4:
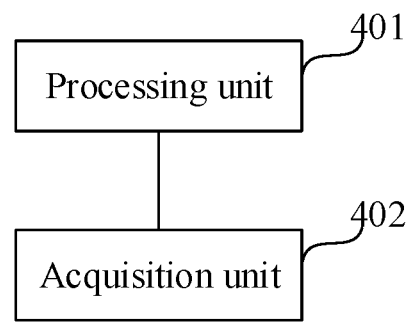
FIG. 4 is a schematic structural diagram of an exemplary blockchain based numerical value ranking apparatus according to some embodiments of the present disclosure.

Based on the technical concept, FIG. 4 is a schematic structural diagram of an exemplary blockchain based numerical value ranking apparatus according to some embodiments of the present disclosure. The apparatus may implement the blockchain based numerical value ranking method.

As shown in FIG. 4, the apparatus includes a processing unit 401 and a acquisition unit 402. The processing unit 401 is configured to use the public key of the first participant to encrypt the private value of the first participant to obtain the encrypted text of the first participant, and to send the encrypted text of the first participant to the blockchain for the on-chain operation. The other participants are participants located in the same blockchain as the first participant and participated in the numerical value ranking process. The acquisition unit 402 is configured to obtain the encrypted texts of the other participants, and to generate the challenge value having the preset bit length.

The processing unit 401 is further configured to determine the mixed results of the first participant with respect to the other participants based on challenge value and the private value of the first participant and the encrypted texts and the public keys of the other participants, and to send the mixed results of the first participant with respect to the other participants to the block chain for the on-chain operation. The processing unit 401 is further configured to determine the numerical value ranking result between the first participant and the second participant based on the mixed result of the second participant with respect to the first participant. The second participant is a participant among the other participants who participate in the bid ranking.

In some embodiments, the processing unit 401 is further configured to use the public keys of the other participants to encrypt the challenge value and the private value of the first participant to obtain the first intermediate value, determine the product of the encrypted texts of the other participants and the challenge value of the first participant as the second intermediate value, and determine the difference between the first intermediate value and the second intermediate value as the mixed results of the first participant with respect to the other participants.

In some embodiments, the processing unit 401 is further configured to obtain from the blockchain the mixed result of the second participant with respect to the first participant, which is uploaded by the second participant, use the private key of the first participant to decrypt the mixed result of the second participant with respect to the first participant to obtain the decrypted result, and determine the numerical value ranking result between the first participant and the second participant based on the positive/negative attribute of the decrypted result.

In some embodiments, the processing unit 401 is further configured to determine that the private value of the first participant is smaller than the private value of the second participant if the positive/negative attribute of the decrypted result is positive, determine that the private value of the first participant is greater than the private value of the second participant if the positive/negative attribute of the decrypted result is negative, and determine that the private value of the first participant is equal to the private value of the second participant if the positive/negative attribute of the decrypted result is zero.

In some embodiments, after the numerical value ranking result between the first participant and the second participant is determined and when it is determined that the first participant is the winner based on the numerical value ranking result between the first participant and the second participant, the processing unit 401 is further configured to send the private key of the first participant to the intermediate party, such that the intermediate party uses the private key of the first participant to decrypt the encrypted text of the first participant to obtain the private value of the first participant.

In some embodiments, after the numerical value ranking result between the first participant and the second participant is determined and when it is determined that the private value of the winner is not disclosed and is in dispute, the processing unit 401 is further configured to verify the legitimacy by sending the private key of the first participant to the intermediate party, or requesting the winner to send the challenge value of the winner to the intermediate party.

Based on the same technical concept, the present disclosure also provides a computing device. The computing device includes a memory for storing program instructions, and a processor configured to call the program instruction stored in the memory and execute the above-described blockchain based numerical value ranking method according to the obtained program instructions.

Based on the same technical concept, the present disclosure also provides a computer-readable non-volatile storage medium including computer-readable instructions. When a computing device reads and executes the computer-readable instructions, the computer-readable instructions cause the computing device to implement the above-described blockchain based numerical value ranking method.

The present disclosure is described with reference to flowcharts and/or block diagrams of the methods, the apparatus (systems), and the computer program products according to embodiments of the present disclosure. It should be understood that each flow and/or each block in the flowcharts and/or the block diagrams, and combinations of the flows and/or the blocks in the flowcharts and/or the block diagrams, can be implemented by the computer program instructions. The computer program instructions may be provided to the processor of a general purpose computer, a special purpose computer, an embedded processor, or other programmable data processing device to produce a machine such that the instructions executed by the processor of the computer or other programmable data processing device produce the apparatus for implementing the functions specified in one or more of the flowcharts and/or one or more blocks of the block diagrams.

The computer program instructions may also be stored in a computer-readable memory capable of directing a computer or other programmable data processing apparatus to function in a particular manner, such that the instructions stored in the computer-readable memory result in an article of manufacture comprising instruction means, the instructions The apparatus implements the functions specified in the flow or flow of the flowcharts and/or the block or blocks of the block diagrams.

These computer program instructions can also be loaded on a computer or other programmable data processing device to cause a series of operational steps to be performed on the computer or other programmable device to produce a computer-implemented process such that the instructions provide steps for implementing the functions specified in the flow or flows of the flowcharts and/or the block or blocks of the block diagrams.

Although the embodiments of the present disclosure have been described, additional changes and modifications to these embodiments may occur to those skilled in the art once the basic inventive concepts are known. Therefore, the appended claims are intended to be construed to include the embodiments and all changes and modifications that fall within the scope of the present disclosure.

It will be apparent to those skilled in the art that various modifications and variations can be made in the present disclosure without departing from the spirit and scope of the disclosure. Thus, if these modifications and variations of the present disclosure fall within the scope of the claims of the present application and their equivalents, the present disclosure is also intended to include these modifications and variations.

What is claimed is:

1. A blockchain based numerical value ranking method, comprising:
   using, by a first participant, a public key of the first participant to encrypt a private value of the first participant to obtain an encrypted text of the first participant, and sending the encrypted text of the first participant to a blockchain for an on-chain operation;
   obtaining, by the first participant, encrypted texts of other participants, and generating a challenge value having a preset bit length;
   based on the challenge value and the private value of the first participant, and the encrypted texts and public keys of the other participants, determining, by the first participant, mixed results of the first participant with respect to the other participants, and sending the mixed results of the first participant with respect to the other participants to the blockchain for the on-chain operation, wherein the other participants are participants that are located in the same blockchain as the first participant and participate in a numerical value ranking process;
   determining, by the first participant, a numerical value ranking result between the first participant and a second participant based on the mixed result of the second participant with respect to the first participant, wherein the second participant is one of the other participants that participate in the numerical value ranking process; and
   after the first participant determines that the first participant is a first winner based on the numerical value ranking result between the first participant and the second participant, sending the private key of the first participant to a intermediate party, such that the intermediate party uses the private key of the first participant to decrypt the encrypted text of the first participant to obtain the private value of the first participant.

2. The method according to claim 1, wherein determining, by the first participant, the mixed results of the first participant with respect to the other participants based on the challenge value and the private value of the first participant, and the encrypted texts and public keys of the other participants comprises:
   using, by the first participant, the public keys of the other participants to encrypt the challenge value and the private value of the first participant to obtain a first intermediate value;
   determining, by the first participant, a product of the encrypted texts of the other participants and the challenge value of the first participant as a second intermediate value; and
   determining, by the first participant, a difference between the first intermediate value and the second intermediate value as the mixed results of the first participant with respect to the other participants.

3. The method according to claim 1, wherein determining, by the first participant, the numerical value ranking result between the first participant and the second participant based on the mixed result of the second participant with respect to the first participant comprises:
   obtaining, by the first participant, from the blockchain the mixed result of the second participant with respect to the first participant that is uploaded by the second participant;
   using, by the first participant, the private key of the first participant to decrypt the mixed result of the second participant with respect to the first participant to obtain a decrypted result; and
   determining, by the first participant, the numerical value ranking result between the first participant and the second participant based on a positive/negative attribute of the decrypted result.

4. The method according to claim 3, wherein determining, by the first participant, the numerical value ranking result between the first participant and the second participant based on the positive/negative attribute of the decrypted result comprises:
   determining, by the first participant, that the private value of the first participant is smaller than a private value of the second participant if the positive/negative attribute of the decrypted result is positive;
   determining, by the first participant, that the private value of the first participant is greater than the private value of the second participant if the positive/negative attribute of the decrypted result is negative; and
   determining, by the first participant, that the private value of the first participant is equal to the private value of the second participant if the positive/negative attribute of the decrypted result is zero.

5. The method according to claim 1, wherein after the numerical value ranking result between the first participant and the second participant is determined by the first participant, the method further comprises: when the first participant determines that the private value of a second winner is in dispute and is not disclosed, verifying a legitimacy by sending the private key of the first participant to the intermediate party or requesting the second winner to send a challenge value of the second winner to the intermediate party.

6. A blockchain based numerical value ranking apparatus, comprising: a memory for storing program instructions; and a processor configured to call the program instructions stored in the memory, wherein when being executed by the processor, the program instructions cause the processor to:
   use a public key of a first participant to encrypt a private value of the first participant to obtain an encrypted text of the first participant, and
   send the encrypted text of the first participant to a blockchain for an on-chain operation; and
   obtain encrypted texts of other participants and generate a challenge value having a preset bit length;
   determine mixed results of the first participant with respect to the other participants based on the challenge value and the private value of the first participant and the encrypted texts and public keys of the other participants, and send the mixed results of the first participant with respect to the other participants to blockchain for the on-chain operation, wherein the other participants are participants that are located in a same blockchain as the first participant and participate in a numerical value ranking process;

determine a numerical value ranking result between the first participant and a second participant based on a mixed result of the second participant with respect to the first participant, wherein the second participant is one of the other participants that participate in the numerical value ranking process; and after the first participant determines that the first participant is a first winner based on the numerical value ranking result between the first participant and the second participant, send the private key of the first participant to a intermediate party, such that the intermediate party uses the private key of the first participant to decrypt the encrypted text of the first participant to obtain the private value of the first participant.

7. The apparatus according to claim 6, wherein the processor is further configured to:

use the public keys of the other participants to encrypt the challenge value and the private value of the first participant to obtain a first intermediate value;

determine a product of the encrypted texts of the other participants and the challenge value of the first participant as a second intermediate value; and determine a difference between the first intermediate value and the second intermediate value as the mixed results of the first participant with respect to the other participants.

8. The apparatus according to claim 6, wherein the processor is further configured to:

obtain from the blockchain the mixed result of the second participant with respect to the first participant that is uploaded by the second participant;

use the private key of the first participant to decrypt the mixed result of the second participant with respect to the first participant to obtain a decrypted result; and determine the numerical value ranking result between the first participant and the second participant based on a positive/negative attribute of the decrypted result.

9. The apparatus according to claim 6, wherein the processor is further configured to:

determine that the private value of the first participant is smaller than a private value of the second participant if the positive/negative attribute of the decrypted result is positive;

determine that the private value of the first participant is greater than the private value of the second participant if the positive/negative attribute of the decrypted result is negative; and determine that the private value of the first participant is equal to the private value of the second participant if the positive/negative attribute of the decrypted result is zero.

10. The apparatus according to claim 6, wherein the processor is further configured to:

when the first participant determines that the private value of a second winner is in dispute and is not disclosed, verify a legitimacy by sending the private key of the first participant to the intermediate party or requesting the second winner to send a challenge value of the second winner to the intermediate party.

11. A non-transitory computer-readable storage medium, comprising:

computer-readable instructions, wherein when being retrieved and executed by a computer, the computer-readable instructions cause the computer to perform:

using a public key of a first participant to encrypt a private value of the first participant to obtain an encrypted text of the first participant, and sending the encrypted text of the first participant to a blockchain for an on-chain operation;

obtaining encrypted texts of other participants, and generating a challenge value having a preset bit length;

based on the challenge value and the private value of the first participant, and the encrypted texts and public keys of the other participants, determining mixed results of the first participant with respect to the other participants, and sending the mixed results of the first participant with respect to the other participants to the blockchain for the on-chain operation, wherein the other participants are participants that are located in the same blockchain as the first participant and participate in a numerical value ranking process;

determining a numerical value ranking result between the first participant and a second participant based on the mixed result of the second participant with respect to the first participant, wherein the second participant is one of the other participants that participate in the numerical value ranking process; and after the first participant determines that the first participant is a first winner based on the numerical value ranking result between the first participant and the second participant, sending the private key of the first participant to a intermediate party, such that the intermediate party uses the private key of the first participant to decrypt the encrypted text of the first participant to obtain the private value of the first participant.

* * * * *